Dec. 22, 1925.
P. H. KRAETCH
SIPHON
Filed July 7, 1925
1,566,753
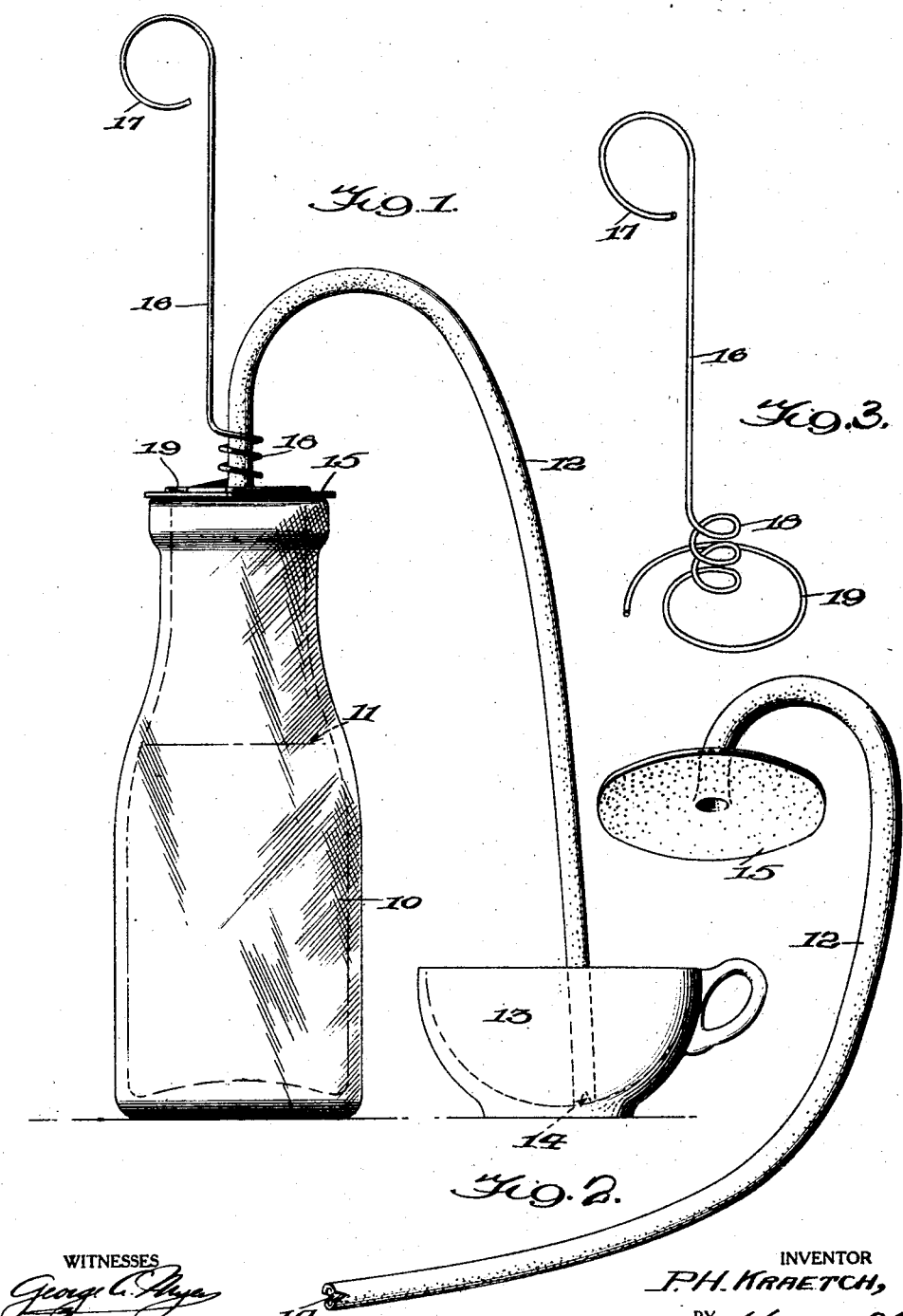
WITNESSES
INVENTOR
P. H. KRAETCH,
BY
ATTORNEYS Patented Dec. 22, 1925.

1,566,753

UNITED STATES PATENT OFFICE.

PAUL HERMAN KRAETCH, OF ASTORIA, OREGON.

SIPHON.

Application filed July 7, 1925. Serial No. 42,056.

*To all whom it may concern:*

Be it known that I, PAUL H. KRAETCH, a citizen of the United States, and a resident of Astoria, in the county of Clatsop and State of Oregon, have made certain new and useful Improvements in Siphons, of which the following is a specification.

My present invention relates generally to siphons and more particularly to siphon devices for removing liquids from bottles, jars and the like, my object being the provision of a simple inexpensive hand controlled and manipulated device by means of which a siphon action may be readily and quickly started in discharging the contents of a bottle, jar, and the like, and the amount of fluid removed from the bottle readily controlled at the will of the operator.

More especially my invention aims to provide a siphon device by means of which cream may be removed from the upper portions of milk bottles and the like, and the liquid discharged to just the desired point in a ready, easy manner.

In the accompanying drawing which illustrates my present invention and forms part of this specification:

Figure 1 is a side view illustrating the practical application of my invention;

Figure 2 is a detailed perspective view of the siphon tube and disk, and,

Figure 3 is a detailed perspective view of the controlling and actuating member.

Referring now to these figures, and particularly to Figure 1 I have shown my improved device applied to a milk bottle generally indicated at 10 for the purpose of discharging cream therefrom down to the line 11, the discharge liquid or cream passing through the tube 12 into a receptacle 13.

The siphon tube 12 is preferably formed of rubber and of one diameter throughout with its outer or discharge end notched at its sides as at 14 in order to permit of the outflow of cream with the end of the tube resting against the bottom of the receptacle 13.

The flexible siphon tube 12 is jointed at its opposite end with a flexible disk 15 through the center of which the said end of the tube opens. The disk and tube may be joined in any suitable manner, but it is preferable that they be formed integral, the disk itself being sufficiently flexible to be easily forced downwardly into the mouth of a milk bottle 10 and being of a slightly greater diameter than the upper smaller portion of the bottle neck.

With the siphon tube and disk I utilize a manual controlling and manipulating member consisting of a rod or relatively heavy stiff wire 16 having its body provided at one end with an enlarged loop and the like 17 adapted to form a handle. At the opposite end of the body the rod or wire 16 is provided with a longitudinal coil 18 of sufficient diameter to permit the siphon tube 12 to be passed through the coil. At the end of the longitudinal coil 18 the adjacent end of the controlling and manipulating member has convolutions of gradually increasing diameter forming a flat coil as at 19 adapted to engage or rest against the disk 15 with the coil 18 surrounding the tube 12 at a point immediately adjacent to said disk. The largest of the convolutions 19 is of less diameter than that of the bottle neck, however, and for this flat coil as well as for the longitudinal coil 18, two or three convolutions are sufficient.

The siphon is employed in use by placing the disk 15 upon the upper end of the bottle neck, which it is adapted to cover and by means of the rod or wire 16, forcing the disk downwardly into the bottle neck and the cream therein so that this cream is forced upwardly into the siphon tube and siphon action started. For this purpose the operator grasps the handle 17 of the controlling and manipulating device and thereafter during the continuance of the siphon action the operator gradually forces the disk 15 downwardly into the bottle neck until the line 11 separating the milk from the cream is reached. It is obvious that as the disk passes below the neck of the bottle it moves out of contact therewith but the siphon action having already been started it is simply necessary for the operator to keep the disk below the upper surface of the liquid. When the line 11 is reached it is simply necessary for the operator to stop further downward movement of the disk and the siphon action will then cease in view of the lack of supply of fluid at the inner end of the siphon tube.

My invention is simple, and inexpensive, is capable of ready manipulation and control, in use employs a tube and controlling and manipulating member which may be readily disassembled in order that both may be effectively cleansed and will be lasting and durable in use.

I claim:—

1. A siphon device including an elongated flexible tube having a flexible disk at one end through which the respective end of the tube opens, and a manual controlling and manipulating member having means to engage the disk and the adjacent end of the tube, and having an elongated upstanding body provided with a handle whereby the disk may be forced downwardly into a receptacle to a desired position therein.

2. A siphon device including a flexible tube, a flexible disk at one end of the tube through which the respective end of the tube opens, and a controlling and manipulating member including a rod having a handle at its upper end and having coils at its lower end, one of said coils adapted to receive the tube therethrough, and the other coil engaging the disk whereby to brace the latter.

PAUL HERMAN KRAETCH.